(12) United States Patent
Pathak et al.

(10) Patent No.: US 12,044,196 B2
(45) Date of Patent: Jul. 23, 2024

(54) CONDENSATION MANAGEMENT FOR INTERNAL COMBUSTION ENGINES

(71) Applicant: Cummins Inc., Columbus, IN (US)

(72) Inventors: Pallav Pathak, Columbus, IN (US); Robert J. Thomas, Indianapolis, IN (US); Andrew Guy Kitchen, Daventry (GB); Balaji Sampathnarayanan, Bloomington, IN (US); Jisang Sun, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/056,485

(22) Filed: Nov. 17, 2022

(65) Prior Publication Data

US 2024/0167439 A1 May 23, 2024

Related U.S. Application Data

(63) Continuation of application No. PCT/US2021/032914, filed on May 18, 2021.

(60) Provisional application No. 63/031,110, filed on May 28, 2020.

(51) Int. Cl.
*F02M 31/20* (2006.01)
*F02B 33/44* (2006.01)

(52) U.S. Cl.
CPC ........... *F02M 31/205* (2013.01); *F02B 33/44* (2013.01)

(58) Field of Classification Search
CPC .............................. F02M 31/205; F02B 33/44
USPC ........................................................ 701/102
See application file for complete search history.

(56) References Cited

U.S. PATENT DOCUMENTS

| | | |
|---|---|---|
| 5,735,245 A | 4/1998 | Kubesh et al. |
| 6,367,256 B1 | 4/2002 | McKee |
| 6,948,475 B1 | 9/2005 | Wong et al. |
| 6,978,772 B1 | 12/2005 | Dorn et al. |
| 7,292,929 B2 | 11/2007 | Durand |
| 7,469,691 B2 | 12/2008 | Joergl et al. |
| 7,530,336 B2 | 5/2009 | Brecheisen, II |
| 8,286,616 B2 | 10/2012 | Clarke et al. |
| 9,109,505 B2 | 8/2015 | Glugla et al. |
| 9,188,056 B2 | 11/2015 | Fulton et al. |
| 9,239,020 B2 | 1/2016 | Fulton et al. |

(Continued)

FOREIGN PATENT DOCUMENTS

| | | | |
|---|---|---|---|
| DE | 102017102433 A1 * | 9/2017 | ............ F02D 41/30 |
| JP | 2570671 B2 | 1/1997 | |
| WO | 2020102466 A1 | 5/2020 | |

OTHER PUBLICATIONS

International Search Report and Written Opinion, PCT Appln. No. PCT/US21/32914, Aug. 24, 2021, 10 pgs.

(Continued)

*Primary Examiner* — Lindsay M Low
*Assistant Examiner* — Omar Morales
(74) *Attorney, Agent, or Firm* — Taft, Stettinius & Hollister LLP

(57) ABSTRACT

Control of an internal combustion engine system in response to a condensation condition associated with a charge air cooler is disclosed. One or more operating parameters of the internal combustion engine are monitored to the control charge air cooler coolant inlet temperature to keep the charge temperature above the estimated dew point to reduce or prevent condensation upstream of the intake manifold.

20 Claims, 5 Drawing Sheets

(56) References Cited

U.S. PATENT DOCUMENTS

| | | |
|---|---|---|
| 9,239,025 B2 | 1/2016 | Clarke et al. |
| 9,605,587 B2 | 3/2017 | Cunningham et al. |
| 9,739,227 B2 | 8/2017 | Stellwagen |
| 9,784,196 B2 | 10/2017 | Ban |
| 9,890,691 B2 | 2/2018 | Banker et al. |
| 9,938,914 B2 | 4/2018 | Brinkmann et al. |
| 2005/0021218 A1 | 1/2005 | Bhargava et al. |
| 2009/0013977 A1 | 1/2009 | Brecheisen, II |
| 2014/0120820 A1 | 5/2014 | Glugla et al. |
| 2014/0150755 A1 | 6/2014 | Cunningham et al. |
| 2014/0251239 A1* | 9/2014 | Richards ............. F02B 29/0468 123/41.05 |
| 2016/0003179 A1 | 1/2016 | Stellwagen |
| 2018/0328265 A1 | 11/2018 | Tordin et al. |
| 2019/0301352 A1 | 10/2019 | Whelan et al. |

OTHER PUBLICATIONS

Extended European Search Report, EP Application No. 21813910.3, dated Apr. 12, 2024, 7 pgs.

\* cited by examiner

CONDENSATION MANAGEMENT FOR INTERNAL COMBUSTION ENGINES

CROSS-REFERENCE TO RELATED APPLICATIONS

The present application is a continuation of International Patent Application No. PCT/US21/32914 filed on May 18, 2021, which claims the benefit of the filing date of U.S. Provisional Application Ser. No. 63/031,110 filed on May 28, 2020, each of which is incorporated herein by reference in its entirety.

FIELD OF THE INVENTION

The present invention relates generally to internal combustion engines, and more particularly is concerned with condensation management for internal combustion engines.

BACKGROUND

Internal combustion engines can operate in many different environments. Some environments create conditions that do not allow the engine to operate at higher loads due to potential for causing damage to engine components. For example, under high humidity and/or high ambient temperature conditions, the likelihood of condensation in the engine intake system is increased for internal combustion engines.

Condensation in the intake system presents many negative impacts. These negative impacts include corrosion formation in the charge air cooler, charge air cooler failure, reduced engine durability, and engine derate. Thus, there remains a need for additional improvements in systems and methods for condensation management in internal combustion engines.

SUMMARY

Unique systems, methods and apparatus are disclosed for controlling operation of an internal combustion engine in response to one or more condensation conditions in the intake system to reduce condensation in the intake system, such as at the charge air cooler. The one or more condensation conditions can include one or more of an intake humidity upstream of a compressor of the intake system and a charge pressure at an outlet of, or downstream of, the compressor. The one or more condensation conditions are evaluated downstream of the compressor and upstream of the intake manifold. The charge air cooler coolant temperature is controlled to maintain the charge temperature above the estimated dew point to prevent, mitigate and/or reduce the amount of condensation that would occur without changing the charge air cooler coolant temperature.

In one embodiment, rate limits, and/or filters are applied to the determination of a target temperature for the charge air cooler coolant. In one embodiment, the internal combustion engine is derated if the increase in charge temperature in response to the condensation condition creates an unacceptable risk of engine knock, loss of throttle margin, turbo overspeed, or other undesired engine operating condition.

In one embodiment, the one or more condensation conditions can include one or more of an intake humidity, an intake air temperature, an intake air pressure, a charge temperature, and a charge pressure. The one or more condensation conditions are evaluated to determine a condensation margin. In response to a condensation margin being less than a condensation margin threshold, one or more engine operating conditions are controlled within limits to increase the condensation margin condition and therefore prevent, mitigate and/or reduce the amount of condensation that would occur without changing the operating conditions.

In one embodiment, the engine operating conditions including control of one or more of the intake valve opening/closing timing, the compressor bypass flow, the air-fuel ratio, the spark timing, the low temperature coolant flow, and the low temperature coolant temperature. In certain embodiments, the intake valve opening/closing timing, the compressor bypass flow, the air-fuel ratio, the spark timing, the low temperature coolant flow, and the low temperature coolant temperature are controlled sequentially to reduce condensation.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
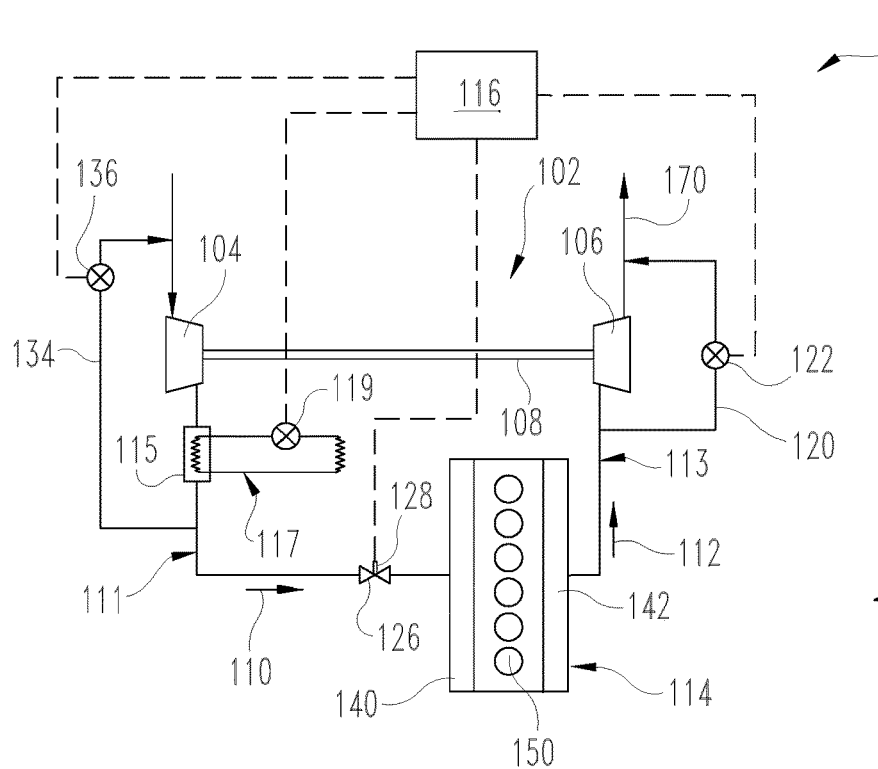
FIG. 1 is a schematic illustration of a portion of an internal combustion engine system for controlling condensation at the charge air cooler.
Figure 1A:
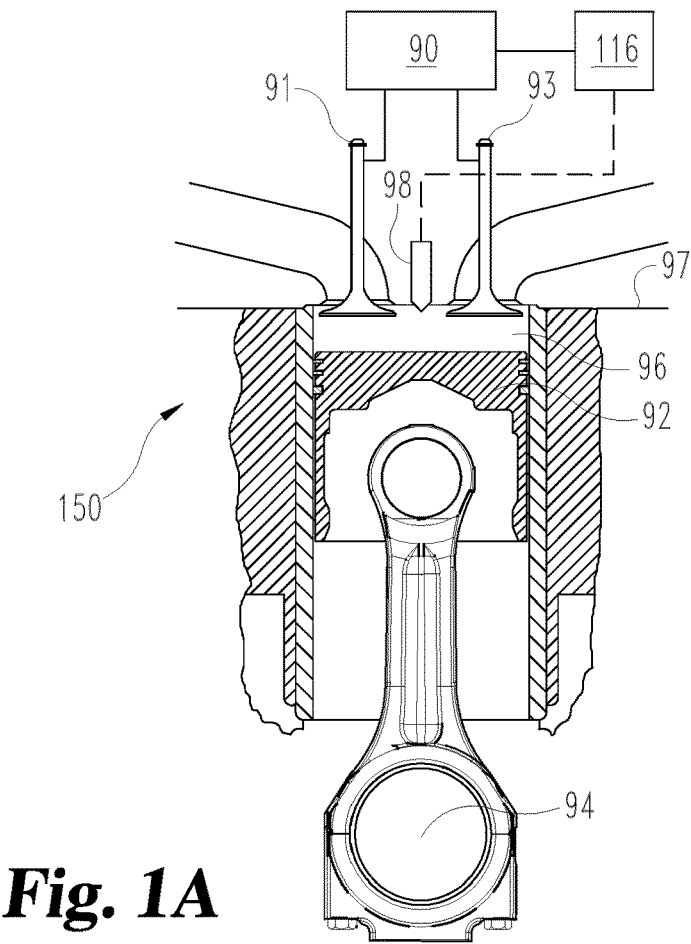
FIG. 1A is a schematic illustration of a cylinder of the engine.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referencing FIG. 1, a system 100 for controlling a condensation condition in an intake system of an internal combustion engine is schematically depicted. The system 100 includes an internal combustion engine 114 with an intake system 111 and an exhaust system 113. In certain embodiments, the engine 114 includes a spark ignited internal combustion engine in which a gaseous fuel flow from a fuel source is pre-mixed with the charge flow for compression by a compressor 104 of turbocharger 102. The gaseous fuel can be, for example, natural gas, bio-gas, methane, propane, ethanol, producer gas, field gas, liquefied natural gas, compressed natural gas, or landfill gas. Other embodiments contemplate other types of internal combustion engines, including compression ignition and dual fuel engines.

In the illustrated embodiment, the engine 114 includes six cylinders 150 in an in-line cylinder arrangement. However, the number of cylinders (individually and collectively referred to as cylinders 150) may be any number, and the arrangement of cylinders 150, unless noted otherwise, may be any arrangement including a multiple cylinder bank arrangement or V-shaped arrangement, and is not limited to the number and arrangement shown in FIG. 1.

The engine 114 emits exhaust gases 112 through an exhaust manifold 142, and exhaust gases 112 flow to the turbocharger 102 in exhaust system 113, and transfer a portion of the kinetic and/or thermodynamic energy of the exhaust gases to the turbine 106 of the turbocharger 102. The transferred energy passes through a shaft 108 of the turbocharger 102 to compressor 104 of the turbocharger 102. Compressor 104 provides a compressed charge flow 110 and fuel mixture to engine 114 through intake system 111.

The compressed charge flow 110 is sometimes called charge air, charge gas, charge flow, intake air, or other terms, none of which are limiting. The compressed charge flow 110 may pass through a charge air cooler 115 before being received by the engine 114. The charge air cooler 115 helps provide for increased air density for the charge flow 110 to the engine 114, although the cooling reduces the pressure of the compressed charge flow 110. The charge air cooler 115 is connected to a cooling loop 117 that includes a temperature control valve 119 to control the temperature and/or flow of low temperature coolant in cooling loop 117 to charge air cooler 115. The low temperature coolant lowers the temperature of the compressed charge flow passing through charge air cooler 115. Charge air cooler 115 may be disposed within the intake system 111 between engine 114 and compressor 104, and embody, for example, an air-to-air heat exchanger, an air-to-liquid heat exchanger, or a combination of both to facilitate the transfer of thermal energy to or from the flow directed to engine 114.

Intake system 111 may further include an intake air throttle 126 that controls the charge flow to the intake manifold 140 of engine 114. Intake air throttle 126 can include a throttle actuator 128 connected to a controller 116 that controls an opening and closing of intake throttle 126 to provide a desired charge flow amount to the intake of engine 114.

Certain features such as an exhaust throttle, an air filter, an intake air heater, and/or exhaust gas recirculation cooler, may be present or not in system 100. The presence and operations of such features are not depicted to enhance the clarity of the description.

Figure 2:
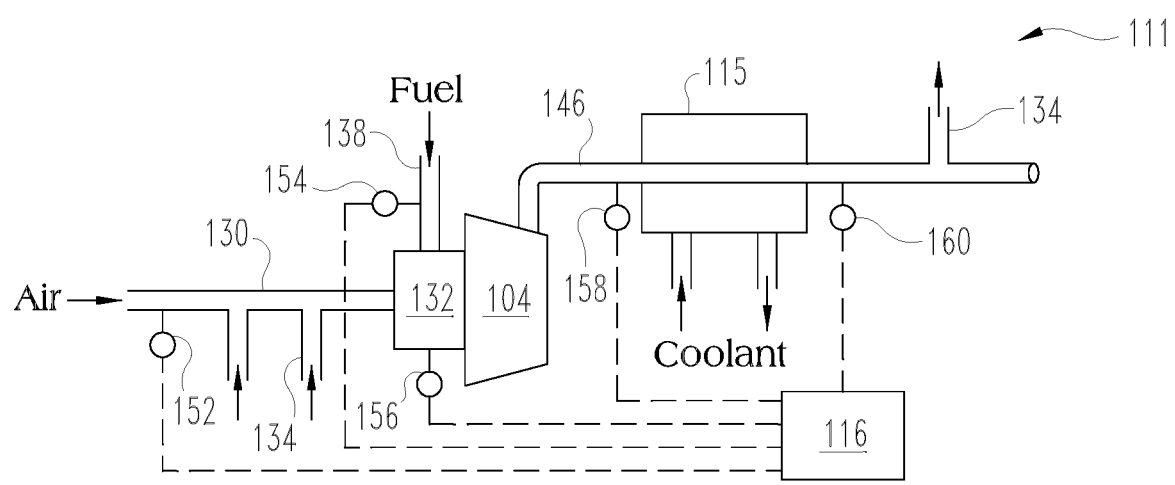
FIG. 2 is a schematic illustration of a part of the intake system of the internal combustion engine system of FIG. 1.

As shown in FIG. 2, the intake system 111 includes an intake air conduit 130 that receives a fresh air flow, which is provided to a mixer 132 connected to the fuel source (not shown) with a fuel conduit 138. The mixer 132 mixes the fresh air flow and the fuel at compressor 104, and the mixture is compressed by compressor 104 and provided to charge air cooler 115 via charge air conduit 146. A compressor recirculation system 134 can be provided with a compressor recirculation valve 136 (FIG. 1) to recirculate the charge air, either downstream from charge air cooler 115 as shown and/or upstream of charge air cooler 115.

The intake system 111 may also include various sensors to provide measurements to controller 116 during operation of the engine 114 to control condensation in the charge air conduit 146 upstream of intake manifold 140. In the illustrated embodiment, an intake sensor 152 can provide measurements of specific humidity, temperature and/or pressure of the fresh intake air flow upstream of compressor 104 in intake air conduit 130. A fuel pressure sensor 154 provides measurements of fuel pressure in fuel conduit 138, and a mixer pressure sensor 156 provides measurements of pressure at mixer 132. A compressor outlet temperature sensor 158 can provide measurements of the charge temperature output from compressor 104, and a compressor outlet pressure sensor 160 can provide pressure measurements of the charge pressure output from the compressor 104. The sensors described herein can be physical or virtual sensors, and are not limited in number, type, or locations shown in the illustrated embodiments.

Referring back to FIG. 1, the turbocharger 102 includes a wastegate 120 that allows exhaust gases 112 to bypass turbine 106. Wastegate (WG) 120 includes a WG valve 122 operably connected to a controllable WG actuator that is operable to open and close WG valve 122 to control the size of the opening of wastegate 120 in response to one or more wastegate actuator position commands from controller 116. Other embodiments contemplate that a turbine with a controllable inlet is provided, such as a variable geometry turbine (VGT), that an exhaust throttle is provided, and/or that no turbine is provided.

An aftertreatment system (not shown) can be connected with an outlet conduit 170. The aftertreatment system may include, for example, oxidation devices (DOC), particulate removing devices (PF, DPF, CDPF), constituent absorbers or reducers (SCR, AMOX, LNT), reductant systems, and other components if desired. In one embodiment, exhaust system 113 is flow coupled to exhaust manifold 142, and may also include one or more intermediate flow passages, conduits or other structures.

As shown in FIG. 2, the cylinder 150 houses a piston 92 that is operably attached to a crankshaft 94 that is rotated by reciprocal movement of piston 92 in a combustion chamber 96 of the cylinder 150. Within a cylinder head 97 of the cylinder 150, there is at least one intake valve 91, at least one exhaust valve 93, and a spark plug 98 that ignites fuel provided to the combustion chamber 96 formed by cylinder 150 between the piston 92 and the cylinder head 97. In certain embodiments, fuel can be provided to combustion chamber 96 by port injection, or by injection in the intake system 111, upstream of combustion chamber 96.

The term "four-stroke" herein means the following four strokes—intake, compression, power, and exhaust—that the piston 92 completes during two separate revolutions of the engine's crankshaft 94. A stroke begins either at a top dead center (TDC) when the piston 92 is at the top of cylinder head 97 of the cylinder 150, or at a bottom dead center (BDC), when the piston 92 has reached its lowest point in the cylinder 150.

During the intake stroke, the piston 92 descends away from cylinder head 97 of the cylinder 150 to a bottom (not shown) of the cylinder 150, thereby reducing the pressure in the combustion chamber 96 of the cylinder 150. A combustion charge is created in the combustion chamber 96 by an intake of air through the intake valve 91 when the intake valve 91 is opened. In one embodiment, cylinder 150 operates according to a Miller cycle so the intake valve 91 closes early or late relative to BDC of the intake stroke. Miller cycle operation of the cylinders 150 is provided to produce higher power density and increased fuel efficiency for spark ignited natural gas engines. Miller cycling coupled with high pressure ratio turbochargers increase the operating pressures in the intake system. These higher pressures increase the potential for condensation, particularly in the charge air cooler 115. Condensation can cause corrosion formation inside the charge air cooler, charge air cooler failure, reduced engine durability, and power derate of the engine, requiring the use of more expensive, corrosion resistant material for the charge air cooler.

The fuel injection and spark timing can be controlled by controller 116. One or more injectors can be electrically connected with controller 116 to receive fueling commands that provide a fuel flow to the respective cylinder 150 in accordance with a fuel command determined according to engine operating conditions and operator demand by reference to fueling maps, control algorithms, or other fueling rate/amount determination source stored in controller 116. Spark plugs 98 are electrically connected with controller 116 to receive spark or firing commands that provide a spark in the respective cylinder 150 in accordance with a spark timing command determined according to engine operating conditions and operator demand by reference to fueling maps, control algorithms, or other fueling rate/amount determination source stored in controller 116.

Furthermore, in one embodiment, actuators for opening and closing the intake and exhaust valves 91, 93 is a variable valve actuation (VVA) system 90. The VVA system 90 may include intake valve opening and closing lobes that are coupled to one or more cam shafts. The VVA system 90 may further include a phaser that may be configured to adjust a relative positioning and timing of the intake valve closing during condensation conditions to reduce or prevent condensation in the charge air cooler 115. In one embodiment, controller 116 is operable to send one or more commands to VVA system 90 to alter or change and intake and/or exhaust valve opening/closing timing.

The system 100 includes the controller 116 structured and configured to perform certain operations to control the coolant control valve 119 to manage a temperature of the charge flow exiting charge air cooler 115. Controller 116 may also be structured and configured to perform certain operations to control the VVA/cam phaser system 90, spark plug(s) 98, wastegate valve 122, compressor bypass valve 136, air intake throttle 126, and coolant control valve 119. In certain embodiments, the controller 116 forms a portion of a processing subsystem including one or more computing devices having memory, processing, and communication hardware. The controller 116 may be a single device or a distributed device, and the functions of the controller 116 may be performed by hardware and/or by a computer executing instructions stored in non-transient memory on one or more computer readable media.

In certain embodiments, the controller 116 includes one or more modules or units structured and configured to functionally execute the operations of the controller 116. The description herein includes the structural independence of various aspects of the controller 116, and illustrates one grouping of operations and responsibilities of the controller 116. Other groupings that execute similar overall operations are understood within the scope of the present application. The operations of the controller 116 may be implemented in hardware, such as one or more circuits, and/or by a computer executing instructions stored in non-transient memory on one or more computer readable media, and may be distributed across various hardware or computer based components.

Example and non-limiting controller implementation elements include sensors, such as those discussed above, providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the controller specification, and any actuator including at least an electrical, hydraulic, or pneumatic actuator, a solenoid, an op-amp, analog control elements (springs, filters, integrators, adders, dividers, gain elements), and/or digital control elements.

The listing herein of specific implementation elements is not limiting, and any implementation element for any controller described herein that would be understood by one of skill in the art is contemplated herein. The controllers herein, once the operations are described, are capable of numerous hardware and/or computer based implementations, many of the specific implementations of which involve mechanical steps for one of skill in the art having the benefit of the disclosures herein and the understanding of the operations of the controllers provided by the present disclosure. More specific descriptions of certain embodiments of controller operations are included in the discussion below.

Certain operations described herein include operations to interpret or determine one or more parameters. Interpreting or determining, as utilized herein, includes an operation to have the value made available by any method known in the art, including at least receiving the value from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any method known in the art (e.g. from an operator input), receiving a value by which the interpreted or determined parameter can be calculated, and/or by referencing a default value that is interpreted or determined to be the parameter value.

The diagrams and related descriptions which follow provide illustrative embodiments of performing procedures for controlling condensation in the charge air cooler by increasing a charge temperature in response to a condensation condition being present. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a non-transient computer readable storage medium, where the computer program product includes instructions causing the computer to execute one or more of the operations, or to issue commands to other devices to execute one or more of the operations.

Figure 3:
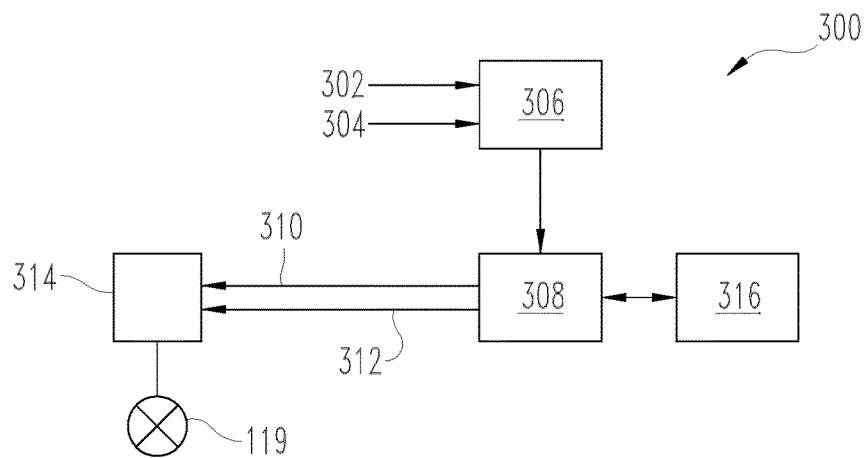
FIG. 3 is a schematic illustration of an example control diagram for controlling condensation at the charge air cooler of the internal combustion engine system of FIG. 1.

The system 100 may further include various sensors, such as sensors 152 and 160 discussed above, for sensing or detecting an engine operating parameter(s) indicative of a condensation condition in the system 100 and generating a corresponding output signal to controller 116. For example, in FIG. 3 there is shown a control apparatus 300 that may be or form a part of controller 116, or may be a controller like controller 116 but a separate controller. Control apparatus 300 is operably connected to one or more real and/or virtual sensors of system 100, such as sensors 152 and 160, that provide inputs to controller apparatus 300 such as a specific humidity 302 of the intake air upstream of compressor 104 and a compressor outlet pressure 304 of the charge flow downstream of compressor 104. In other embodiments, a humidity condition is measured downstream of the compressor 104. In one embodiment, for example, the inputs 302, 304 are may be provided to an engine control unit 306 associated with engine 114, and engine control unit 306 determines a condensation condition in response to inputs 302, 304, such as a charge temperature falling below a dew point of the charge flow and one or more temperature limits for the charge air cooler coolant that are based on the dew point.

Controller apparatus 300 further includes a valve control unit 308 connected to engine control unit 306 via a communications link, such as a CAN bus. Valve control unit 308 receives the condensation condition and the one or more temperature limits for the charge air cooler coolant, and determines one or more commands, such as a valve open command 310 or a valve close command 312, that is provided to actuator 314 of the temperature control valve 119 of the coolant circuit 117. The valve open and close commands 310, 312 are determined to provide a coolant flow of the charge air cooler coolant that adjusts the charge air temperature to be at, or slightly above, the dew point temperature, with or without a safety margin, to reduce, mitigate, and/or prevent condensation in charge air conduit 146.

Controller apparatus 300 may further include an input/output device 316, such as a human machine interface device, computer, keyboard, display, mouse, touchscreen, smartphone, tablet, server, cloud, etc. Input/output device 316 is connected to valve control unit 308 via any suitable wired connection, such as Ethernet, or wireless connection. Input/output device 316 allows a user to input various parameters, such as a setpoint for the coolant temperature, rate limits for controlling coolant temperature changes, and/or to enable/disable derate of engine 114. Input/output device 316 can also display various information, such as a condensation condition or risk, to the user, technician, or manager of engine 114.

Figure 4:
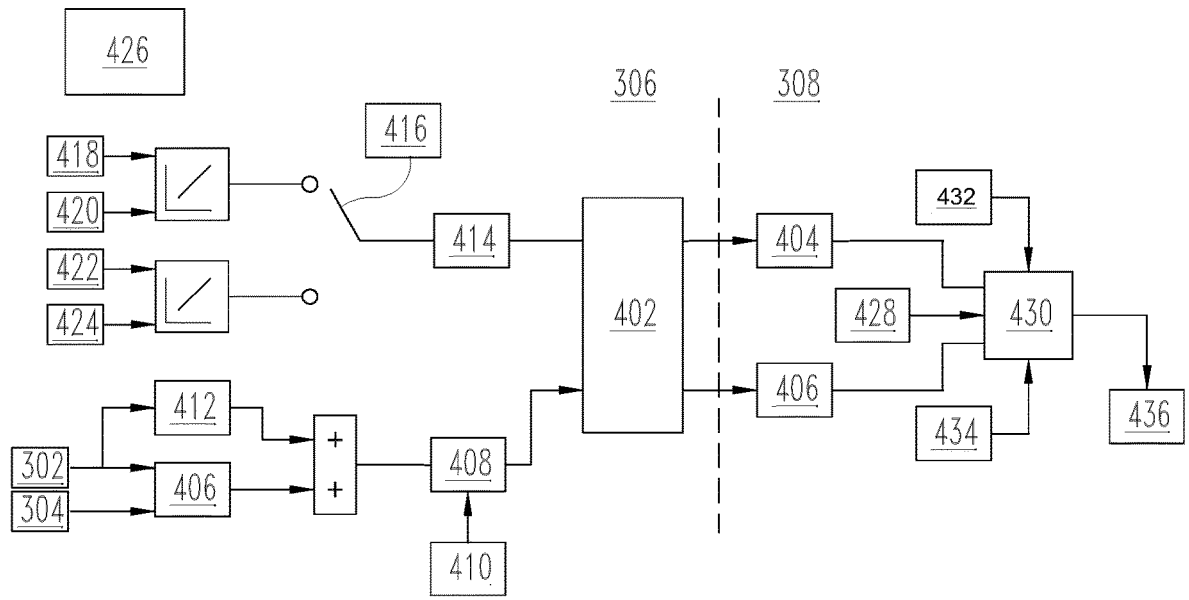
FIG. 4 is a diagram of an example control scheme for controlling condensation at the charge air cooler of the internal combustion engine system of FIG. 1.

Referring to FIG. 4, a control scheme 400 is shown that can be implemented by control apparatus 300 described above. Engine control unit 306 includes limit arbitration logic 402 that arbitrates a minimum coolant temperature limit 404 and a maximum coolant temperature limit 406 and outputs them to valve control unit 308. The minimum coolant temperature limit 404 is based on a calibratable minimum target 410 for the coolant temperature and minimum temperature limit 408 for the charge flow. Minimum temperature limit 408 is based on a dew point of the charge flow at the compressor outlet as determined by a dew point calculator 406 in response to inputs 302, 304. The minimum temperature limit 408 is further based on a target margin 412 that is added to the dew point temperature.

The maximum coolant temperature limit 406 is based on a maximum temperature limit 414 for the charge flow associated with undesirable engine operating conditions, such as knock, turbo overspeed, combustion stability, etc. A maximum temperature limit 414 is determined based on a fuel type selection 416, which can be selected by the user. Depending on the selected fuel type 416, protection limits for the coolant temperature can be based on charge pressure 418 and methane number 420, or charge pressure 422 and lower heating value (LHV) 424. Various enable conditions 426 can also be required to be satisfied before determination of the minimum coolant temperature limit 404 and maximum coolant temperature limit 406. Example enable conditions can include, for example, temperature conditions of one or more components or fluids of engine 114, load conditions, etc.

Valve control unit 308 includes rate limiter or filter logic 430 that receives a user input temperature target temperature 428, the minimum coolant temperature limit 404, and maximum coolant temperature limit 406. Logic 430 also includes an increasing rate limit 432 and a decreasing rate limit 434 for limiting the rate of change of the coolant temperature. Logic 430 outputs a target temperature 436 for the coolant inlet temperature of the coolant provided to charge air cooler 115. The target temperature 436 is used to determine the valve open command 310 or valve close command 312 to control the coolant flow to achieve the target temperature 436 at the coolant inlet to charge air cooler 115.

The dew point is the temperature at which the air-fuel mixture at the specified pressure and humidity conditions condensates in charge air cooler 115. The higher risk of condensation occurs at high charge pressures and/or low charge temperatures. Therefore, charge pressure can be reduced or charge temperature can be increased to reduce condensation, but there are limits to the temperature increase due to knock limits and in-cylinder temperature limits for engine 114. As a result, the present disclosure provides for an engine derate when the target temperature 436 exceeds the maximum coolant temperature limit 406. Such limits may include, but are not limited to, knock, peak cylinder pressure, emissions, and combustion stability for operation of engine 114.

In one embodiment, the control procedure receives inputs of a humidity condition, such as specific humidity, of the intake air upstream of the compressor and pressure of the charge flow at the compressor outlet. The outputs include the target temperature 436 for the coolant circulated through charge air cooler 115 to increase the charge temperature to mitigate or eliminate condensation (e.g. at or above a dew point temperature), and a valve open command 310 or valve close command 312 to control the coolant flow through the charge air cooler 115 to achieve the target temperature 436. The outputs also include an upper limit for the coolant temperature to protect engine 114 from over temperature conditions. These outputs are updated in real time to mitigate condensation at the charge air cooler 115. As discussed above, rate limits and/or filters can be used to manage the coolant temperature changes.

Figure 5:
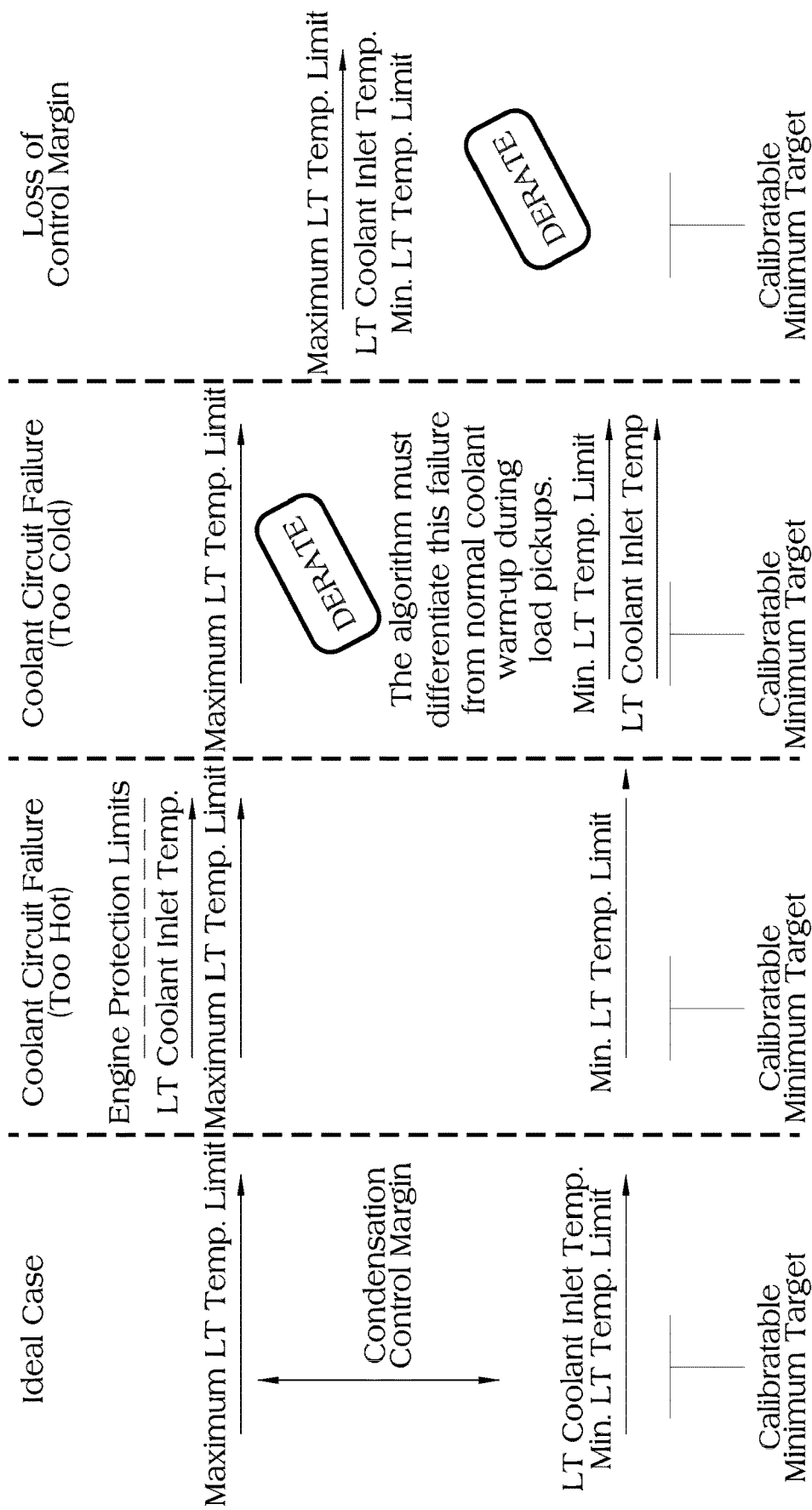
FIGS. 5A-5D are graphic illustrations showing exemplary control diagnostics for the internal combustion engine system of FIG. 1.

In FIGS. 5A-5D, various operating conditions for the charge air cooler coolant temperature based on the present disclosure are shown schematically. In FIG. 5A, the temperature for the coolant is at or near the lower limit, and a condensation control margin is provided from the lower limit to the upper limit. In this scenario, condensation at the charge air cooler 115 is able to be controlled using the coolant temperature circulated through the charge air cooler 115 to increase the charge temperature.

In FIG. 5B, a coolant circuit failure is shown in which the temperature for the coolant is above the upper limit, but still below engine protection limits. In this scenario, a coolant circuit failure can be indicated since the coolant temperature is too hot.

In FIGS. 5C and 5D, engine derate conditions are shown. For example, in FIG. 5C the coolant temperature is less than the lower limit needed to provide condensation mitigation. Therefore, the coolant circuit is too cold and the engine load is derated to control the charge temperature and/or charge pressure for condensation mitigation in the charge flow. If the charge temperature is unavailable, an estimate may be obtained as a function of the charge air cooler coolant outlet temperature and/or intake manifold temperature. This scenario requires a differentiation of this failure mode from normal coolant warmup period required as the engine gains load. In FIG. 5D there is shown a loss of control margin due to the lower limit for the target temperature being at or exceeding the maximum limit. In this scenario the engine is derated to lower the dew point of the charge flow at the charge air cooler 115.

Figure 6:
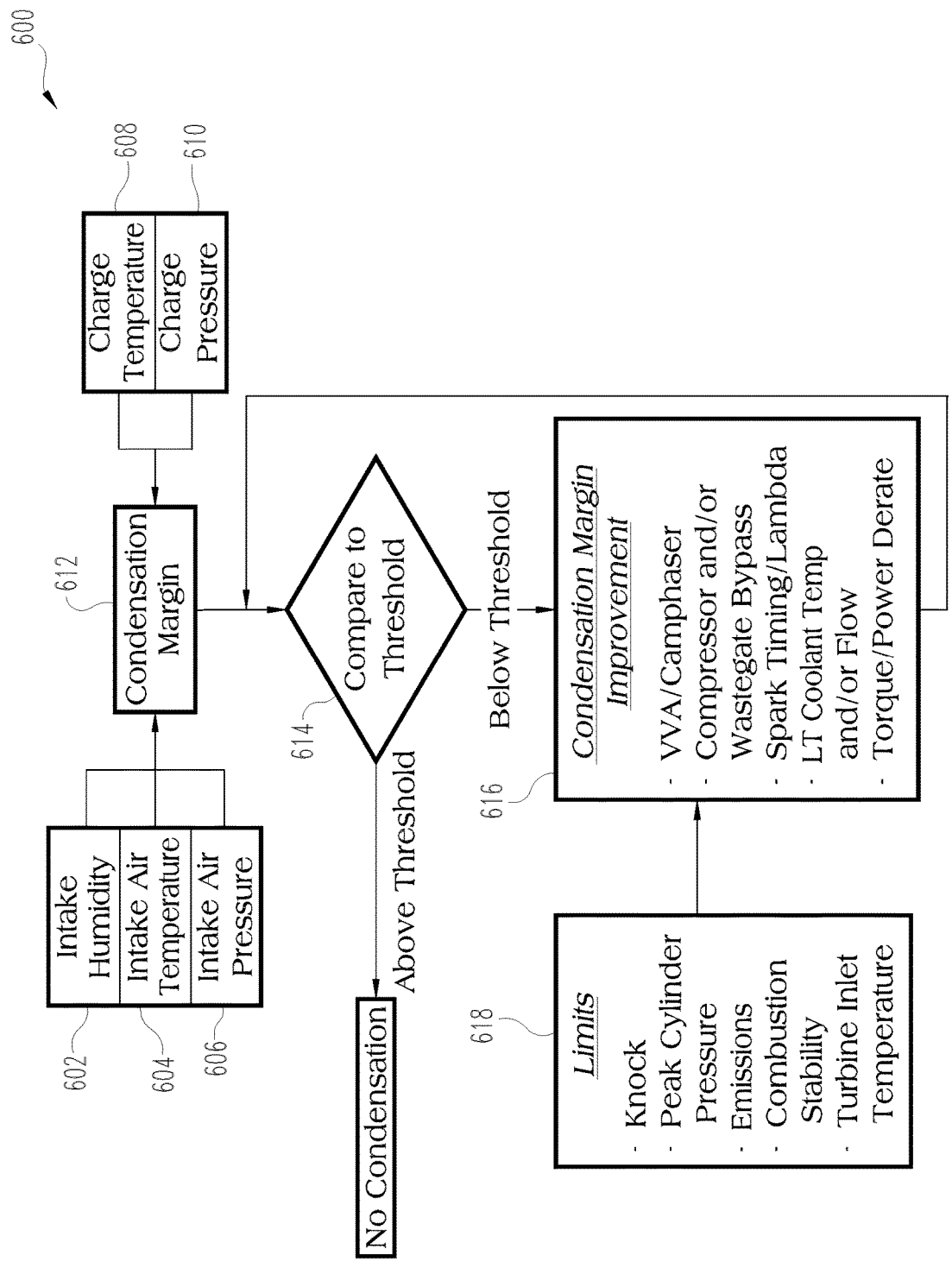
FIG. 6 is a schematic illustration of another embodiment controller apparatus for controlling condensation at the charge air cooler.

The control system may also include various sensors for sensing or detecting an engine operating condition indicative of a condensation margin or condensation condition in the system 100 and generating a corresponding output signal to controller 116. For example, in FIG. 6, there is shown one embodiment control apparatus 600 that may be or form a part of controller 116, or may be a controller like controller 116 but a separate controller. Control apparatus 600 is operably connected to one or more real and/or virtual sensors of system 100 provide inputs to controller apparatus 600 such as an intake humidity 602, an intake air temperature 604, an intake air pressure 606, a charge temperature 608, and a charge pressure 610. Controller apparatus 600 includes a condensation margin determination module or block 612 that determines a condensation margin for charge air cooler 115 based on inputs 602-610 and a reference temperature.

In one embodiment, the condensation margin is a difference between the reference temperature, such as at the charge air cooler 115 or at the intake manifold 140 or an average of such temperatures, and the dew point at the charge air cooler 115. The higher risk of condensation occurs at high charge pressures and low charge temperatures. Therefore, charge pressure and/or charge temperatures can be controlled to reduce or eliminate condensation, but there are limits to the temperature increase due to knock limits and in-cylinder temperature limits. As a result, the present disclosure also provides a procedure that employs two or more operating levers to also reduce intake air or charge pressure while increasing the charge temperature to lower the dew point at the charge air cooler, thus increasing the condensation margin.

The condensation margin is output from module or block 612 and provided to a decision module or block 614 in which the condensation margin is compared to a threshold. If the condensation margin is more than the threshold, there is no condensation in the charge air cooler 115 and condensation mitigation or condensation margin improvement measures are not required. If the condensation margin is less than the threshold, the controller apparatus 600 includes condensation margin improvement module or block 616 in which one or more operating levers are controlled to reduce intake air or charge pressure and/or increase charge temperature.

The controller apparatus 600 is operable to provide one or more commands to the operating levers including a VVA/cam phaser 90, compressor bypass valve 136, and/or spark plug 98 to reduce intake air or charge pressure, one or commands to coolant valve 119 to reduce low temperature coolant temperatures and/or flow to increase intake air or charge temperatures, and to engine 114 to derate if necessary. In one embodiment, these commands are provided in the priority order listed above. In another embodiment, the amount of pressure change or temperature change that is achievable by respective operating lever is limited by limits provided in limits block 618. Such limits may include, but are not limited to, knock, peak cylinder pressure, emissions, and combustion stability.

As discussed above, the positioning of each of the actuators, switches, or other devices associated with the operating levers can be controlled via control commands from controller apparatus 600. In certain embodiments of the systems disclosed herein, controller apparatus 600 is structured and configured to perform certain operations to control engine operations to provide the desired engine speed, torque outputs, spark timing, lambda, and other outputs or adjustments in response to the condensation margin being less than a condensation margin threshold.

As also discussed above, there are two physical levers that can be used to actively control/avoid condensation: temperature and pressure. The lever with the largest impact is temperature control. However, the upper temperature limit is generally dictated by its impact on engine combustion. Therefore, further reduction in condensation is addressed with pressure reduction of the charge flow in one embodiment procedure.

There is disclosed herein procedures for reducing charge air cooler pressure that include manipulating lambda (air-fuel ratio), variable valve timing (volumetric efficiency), throttle margin, engine load derate, spark timing, compressor bypass, and wastegate. Accordingly, in one embodiment of the procedure a control strategy has been identified to select target charge air cooler temperature and target charge air cooler pressure in real time.

The control procedure assumes the condensation control interfaces with the charge air cooler outlet temperature control and the air handling control, which can take a boost limit as input. The air handling control is responsible for meeting this request by changing valve phasing and/or limiting engine load. Some feedback may be added to reduce uncertainty. Since this control is relatively slow compared to other engine controls, it can be updated in real time based on knock and/or other combustion metric measurements. Margins could be added to pressure and temperature commands to account for measurement errors, local condensation and controller tracking performance.

In one embodiment, the control procedure receives inputs of a humidity condition (such as relative humidity) and temperature at the compressor inlet, pressure at the compressor outlet, and a temperature at the charge air cooler outlet. The outputs include the charge air cooler outlet temperature command for charge air cooler temperature control and a charge air cooler outlet pressure upper limit control command for air handling/pressure control of the charge flow.

The procedure includes measuring the compressor inlet relative humidity RHci and compressor inlet temperature Tci (or equivalent) to calculate vapor pressure. The compressor outlet pressure Pco and compressor outlet temperature Tcaco are also measured.

The procedure further includes calculating the compressor inlet vapor pressure vci based on these measurements. The maximum charge temperature Tco,max at the compressor outlet is then determined as a function of mechanical and combustion limits.

The procedure also includes determining or calculating a desired minimum charge air cooler temperature Tcaco,des such that the saturated vapor pressure at the compressor outlet is:

$$v_{cac,sat}(T_{caco,des}) = P_{caco}/P_{ci}\, v_{ci}(RH_{ci}, T_{ci}),$$

The control procedure then determines if Tcaco,des<Tco, max. If yes, then Tcaco,cmd=Tcaco,des and if no then Tcaco,cmd=Tco,max. The charge air cooler outlet pressure command is then determined as follows:

$$P_{caco,cmd} = \frac{v_{cac,sat}(T_{caco})P_{ci}}{v_{ci}(RH_{ci}, T_{ci})}$$

These commands are updated in real time to mitigate condensation at the charge air cooler 115. As discussed above, the pressure control can be implemented by controlling one or more of the operating levers including the VVA/cam phaser 90, compressor bypass valve 136, and/or spark plug 98 to reduce charge air pressure in response to a charge air cooler outlet pressure upper limit control command. In addition, one or more charge air cooler outlet temperature commands can be provided to coolant valve 119 to reduce low temperature coolant temperatures and/or flow to increase charge air temperatures. A command to derate engine 114 can also be provided if necessary to maintain the condensation margin.

The present application provides a control strategy for condensation management would have several benefits in terms of engine operation and durability. Some of the benefits include the ability to optimize engine operation using control parameters under high humidity conditions at full load, the engine not having to be derated when humidity is high, a higher degree of control that helps with better combustion management, and reduced corrosion of intake system parts which leads to higher durability.

According to an aspect of the present disclosure, a method includes: determining a condensation condition for a charge air cooler in response to a humidity condition and a pressure associated with an intake system of an internal combustion engine, the intake system further including a compressor having a compressor inlet and a compressor outlet, and a charge air cooler downstream of the compressor; in response to the condensation condition, determining a lower temperature limit for a coolant circulated through the charge air cooler; determining an upper temperature limit for the coolant in response to one or more engine protection conditions; and adjusting a coolant control valve to maintain a target temperature of the coolant between the lower limit and the upper limit.

In an embodiment, the condensation condition is indicative of a charge temperature falling below a dew point in the intake system downstream of the compressor and upstream of an intake manifold of the internal combustion engine.

In an embodiment, adjusting the coolant control valve increases the temperature of the coolant circulated through the charge air cooler to a target temperature. In an embodiment, adjusting the coolant control valve reduces a flow of the coolant circulated through the charge air cooler. In an embodiment, adjusting the coolant control valve increases the temperature of the coolant circulated through the charge air cooler to a target temperature and reduces a flow of the coolant circulated through the charge air cooler.

In an embodiment, the humidity condition and the pressure associated with the intake system include an intake air specific humidity upstream of the compressor and a compressor outlet pressure. In an embodiment, the condensation condition is indicative of a charge temperature falling below a dew point of the charge air cooler and the lower limit is based on the dew point.

In an embodiment, the method includes, in response to the temperature of the coolant being less than the lower limit, derating the internal combustion engine based on at least one of a charge temperature and a charge pressure.

In an embodiment, the method includes derating the internal combustion engine in response to the lower limit exceeding the upper limit. In an embodiment, the method includes applying at least one of a rate limit and a filter to the determination of the target temperature for the coolant.

According to an aspect of the present disclosure, a system includes an internal combustion engine including an intake system with an intake manifold, a compressor, and a charge air cooler upstream of the intake manifold and downstream of the compressor. The system includes a coolant circuit connected to the charge air cooler for supplying a coolant to the charge air cooler, and the coolant circuit includes a coolant control valve for controlling a flow of the coolant in the coolant circuit. The system includes an electronic controller connected to the internal combustion engine and the coolant control valve. The electronic controller is configured to determine a condensation condition for the charge air cooler in response to a humidity condition in the intake system upstream of the compressor and a pressure in the intake system downstream of the compressor, determine a lower limit for a target temperature of the coolant and an upper limit for the target temperature in response to the condensation condition, and adjust the coolant control valve in response to maintain a temperature of the coolant between the lower limit and the upper limit.

In an embodiment, the electronic controller includes an engine control unit connected to a humidity sensor and a pressure sensor to receive measurements of the humidity condition and the pressure, and a valve control unit connected to the engine control unit and to the coolant control valve. The valve control unit is configured to determine a coolant control valve command to open or close the coolant control valve in response to the target temperature.

In an embodiment, the valve control unit is connected to an input/output device. The input/output device is configured to output an indication of the condensation condition from the valve control unit, and receive inputs for at least one of a rate limit for the target temperature, a user setpoint for the target temperature, and an enable/disable command for derate of the internal combustion engine.

In an embodiment, the engine control unit is configured to determine the lower limit and the upper limit for the target temperature and communicate the lower limit and the upper limit to the valve control unit, and the valve control unit is configured to determine the target temperature in response to the lower limit, the upper limit, and the user setpoint for the target temperature. In an embodiment, the valve control unit is configured to limit or filter the determination of the target temperature over time.

In an embodiment, the condensation condition is indicative of a charge temperature falling below a dew point in the intake system at an outlet of the charge air cooler upstream of the intake manifold. In an embodiment, the electronic control unit is configured to limit a rate of change of the target temperature from a previous target temperature.

In an embodiment, the electronic control unit is configured to derate the internal combustion engine in response to the lower limit exceeding the upper limit. In an embodiment, in response to the temperature of the coolant being less than the lower limit, the electronic control unit is configured to derate the internal combustion engine.

According to an aspect of the present disclosure, an apparatus includes an electronic controller operatively connected with an internal combustion engine including an intake system that includes a compressor and a charge air cooler. The electronic controller is configured to determine a condensation condition for a charge flow through the charge air cooler in response to a humidity condition upstream of the compressor and a pressure downstream of the compressor and, in response to the condensation condition, adjust a coolant control valve in response to a target temperature for a coolant circulating through the charge air cooler that is between a lower limit associated with the dew point and an upper limit associated with engine protection limits.

In an embodiment, the condensation condition is indicative of a charge temperature falling below a dew point of the charge flow upstream of an intake manifold of the internal combustion engine.

According to an aspect of the present disclosure, a method includes: determining a condensation condition for a charge air cooler in response to at least one of a humidity condition, a temperature, and a pressure associated with an intake system of an internal combustion engine system, the intake system further including a compressor having a compressor inlet and a compressor outlet; in response to the condensation condition being present, determining a charge air cooler pressure command; and adjusting at least one of an intake valve and an exhaust valve actuation using one of a variable valve actuator or a phaser of the internal combustion engine in response to the charge air cooler pressure command to decrease a pressure and lower a dew point at the charge air cooler.

In an embodiment, the method includes, in response to the condensation condition being present: determining the charge air cooler pressure command based on a saturated vapor pressure at the charge air cooler, a temperature of the charge air cooler, a compressor inlet pressure, a compressor inlet vapor pressure, a compressor inlet temperature, and the humidity condition; setting a charge air cooler temperature command to a maximum allowed temperature for the charge air cooler; increasing a temperature of the charge air cooler to the maximum allowed temperature in response to the charge air cooler temperature command; and adjusting a spark timing of one or more cylinders of the internal combustion engine in response to the charge air cooler pressure command.

In an embodiment, increasing the temperature of the charge air cooler includes increasing a temperature of a coolant flowing to the charge air cooler. In an embodiment, increasing the temperature of the charge air cooler includes reducing a flow of a coolant to the charge air cooler.

In an embodiment, the humidity condition, temperature and the pressure associated with the intake system include an intake relative humidity, an intake air temperature, an intake air pressure, a charge temperature and a charge pressure. In an embodiment, the condensation condition is indicative of a charge temperature falling below a dew point at the charge air cooler, and decreasing the pressure at the charge air cooler lowers the dew point.

In an embodiment, the method includes opening a compressor bypass valve in response to the charge air cooler pressure command. In an embodiment, the method includes decreasing an air-fuel ratio to one or more cylinders of the internal combustion engine in response to the charge air cooler pressure command.

According to an aspect of the present disclosure, a method includes determining a condensation margin for a charge air cooler in response to a humidity condition, a temperature and a pressure associated with an intake system of an internal combustion engine system, the intake system further including a compressor having a compressor inlet and a compressor outlet; and in response to the condensation margin exceeding a condensation margin threshold, adjusting at least one of an intake valve and exhaust valve actuation using one of a variable valve actuation or a phaser of the internal combustion engine to decrease a pressure at the charge air cooler and lower a dew point at the charge air cooler.

In an embodiment, the method includes, in response to the condensation condition being present: setting a charge air cooler temperature command to a maximum allowed temperature; and increasing a temperature of the charge air cooler in response to the charge air cooler temperature command.

In an embodiment, the condensation margin is associated with a dew point of the charge air cooler and decreasing the pressure at the charge air cooler lowers the dew point.

In an embodiment, the method includes one or more of: opening a compressor bypass valve in response to the charge air cooler pressure command; decreasing an air-fuel ratio to one or more cylinders of the internal combustion engine in response to the charge air cooler pressure command; and adjusting a spark timing of one or more cylinders of the internal combustion engine in response to the charge air cooler pressure command.

According to an aspect of the present disclosure, an apparatus includes an electronic controller operatively connected with an internal combustion engine including an intake system that includes a compressor and a charge air cooler. The electronic controller is configured to determine a condensation margin for a charge air cooler in response to a humidity condition, a temperature, and a pressure associated with the intake system and, in response to the condensation margin exceeding a condensation margin threshold, adjust at least one of an intake valve and an exhaust valve actuation of the internal combustion engine to decrease a pressure at the charge air cooler.

In an embodiment, the controller is configured to determine the charge air cooler pressure command based on a saturated vapor pressure at the charge air cooler, a temperature of the charge air cooler, a compressor inlet pressure, a compressor inlet vapor pressure, a compressor inlet temperature, and the humidity condition.

In an embodiment, the controller is configured to set a charge air cooler temperature command to a maximum allowed temperature for the charge air cooler and increase a temperature of the charge air cooler to the maximum allowed temperature in response to the charge air cooler temperature command.

In an embodiment, the controller is configured to increase the temperature of the charge air cooler by at least one of increasing a temperature of a coolant flowing to the charge air cooler and reducing a flow of a coolant to the charge air cooler.

In an embodiment, the controller is configured to open a compressor bypass valve in response to the charge air cooler pressure command. In an embodiment, the controller is configured to decrease an air-fuel ratio to one or more cylinders of the internal combustion engine in response to the charge air cooler pressure command. In an embodiment, the controller is further configured to adjust a spark timing of one or more cylinders of the internal combustion engine in response to the charge air cooler pressure command.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
    determining a condensation condition for a charge air cooler in response to a humidity condition and a pressure associated with an intake system of an internal combustion engine, the intake system further including a compressor having a compressor inlet and a compressor outlet, and a charge air cooler downstream of the compressor;
    in response to the condensation condition, determining a lower temperature limit for a coolant circulated through the charge air cooler;
    determining an upper temperature limit for the coolant in response to one or more engine protection conditions; and
    adjusting a coolant control valve to maintain a target temperature of the coolant between the lower limit based on the condensation condition and the upper limit based on the one or more engine protection conditions.

2. The method of claim 1, wherein the condensation condition is indicative of a charge temperature falling below a dew point in the intake system downstream of the compressor and upstream of an intake manifold of the internal combustion engine.

3. The method of claim 2, wherein adjusting the coolant control valve increases the temperature of the coolant circulated through the charge air cooler to a target temperature.

4. The method of claim 2, wherein adjusting the coolant control valve reduces a flow of the coolant circulated through the charge air cooler.

5. The method of claim 2, wherein adjusting the coolant control valve increases the temperature of the coolant circulated through the charge air cooler to a target temperature and reduces a flow of the coolant circulated through the charge air cooler.

6. The method of claim 5, wherein the condensation condition is indicative of a charge temperature falling below a dew point of the charge air cooler and the lower limit is based on the dew point.

7. The method of claim 1, wherein the humidity condition and the pressure associated with the intake system include an intake air specific humidity upstream of the compressor and a compressor outlet pressure.

8. The method of claim 1, further comprising, in response to the temperature of the coolant being less than the lower limit, derating the internal combustion engine based on at least one of a charge temperature and a charge pressure.

9. The method of claim 1, further comprising derating the internal combustion engine in response to the lower limit exceeding the upper limit.

10. The method of claim 1, further comprising applying at least one of a rate limit and a filter to the determination of the target temperature for the coolant.

11. A system, comprising:
    an internal combustion engine including an intake system with an intake manifold, a compressor, and a charge air cooler upstream of the intake manifold and downstream of the compressor;
    a coolant circuit connected to the charge air cooler for supplying a coolant to the charge air cooler, the coolant circuit including a coolant control valve for controlling a flow of the coolant in the coolant circuit;
    an electronic controller connected to the internal combustion engine and the coolant control valve, wherein the electronic controller is configured to:
        determine a condensation condition for the charge air cooler in response to a humidity condition in the intake system upstream of the compressor and a pressure in the intake system downstream of the compressor;
        determine a lower limit for a target temperature of the coolant in response to the condensation condition and an upper limit for the target temperature in response to one or more engine protection conditions; and
        adjust the coolant control valve in response to the condensation condition to maintain a temperature of the coolant between the lower limit and the upper limit.

12. The system of claim 11, wherein the electronic controller includes:
    an engine control unit connected to a humidity sensor and a pressure sensor to receive measurements of the humidity condition and the pressure; and
    a valve control unit connected to the engine control unit and to the coolant control valve, valve control unit being configured to determine a coolant control valve command to open or close the coolant control valve in response to the target temperature.

13. The system of claim 12, wherein the valve control unit is connected to an input/output device, and the input/output device is configured to:
    output an indication of the condensation condition from the valve control unit; and
    receive inputs for at least one of a rate limit for the target temperature, a user setpoint for the target temperature, and an enable/disable command for derate of the internal combustion engine.

14. The system of claim 13, wherein the engine control unit is configured to determine the lower limit and the upper limit for the target temperature and communicate the lower limit and the upper limit to the valve control unit, and the valve control unit is configured to determine the target temperature in response to the lower limit, the upper limit, and the user setpoint for the target temperature, and the valve control unit is configured to limit or filter the determination of the target temperature over time.

15. The system of claim 11, wherein the condensation condition is indicative of a charge temperature falling below a dew point in the intake system at an outlet of the charge air cooler upstream of the intake manifold.

16. The system of claim 11, wherein the electronic control unit is configured to limit a rate of change of the target temperature from a previous target temperature.

17. The system of claim 11, wherein the electronic control unit is configured to derate the internal combustion engine in response to the lower limit exceeding the upper limit.

18. The system of claim 11, wherein, in response to the temperature of the coolant being less than the lower limit, the electronic control unit is configured to derate the internal combustion engine.

19. An apparatus, comprising:
    an electronic controller operatively connected with an internal combustion engine including an intake system that includes a compressor and a charge air cooler, the electronic controller being configured to determine a condensation condition for a charge flow through the charge air cooler in response to a humidity condition upstream of the compressor and a pressure downstream of the compressor and, in response to determining the condensation condition, adjust a coolant control valve in response to a target temperature for a coolant circulating through the charge air cooler that is between a lower limit associated with a dew point of the condensation condition and an upper limit associated with engine protection limits.

20. The apparatus of claim 19, wherein the condensation condition is indicative of a charge temperature falling below a dew point of the charge flow upstream of an intake manifold of the internal combustion engine.

* * * * *